Figure 1:
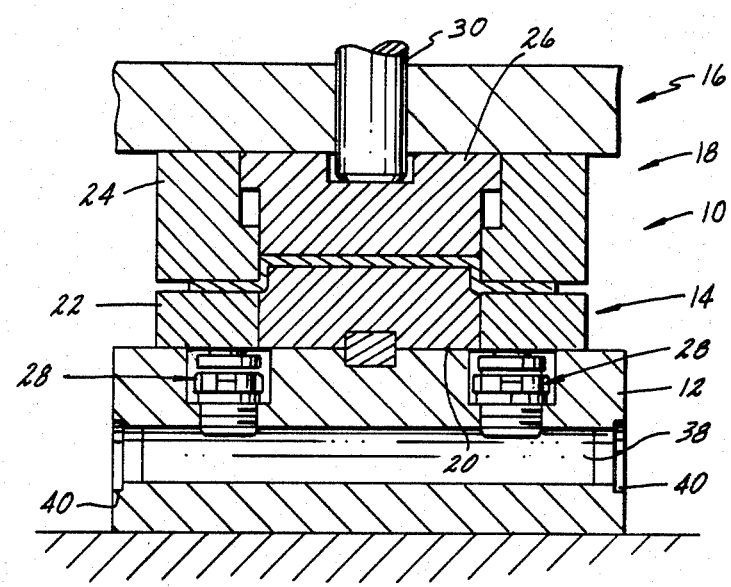

United States Patent [19]

Wallis

[11] Patent Number: 4,529,181
[45] Date of Patent: Jul. 16, 1985

[54] FLUID DIE SPRING

[76] Inventor: Bernard J. Wallis, 25315 Kean Ave., Dearborn, Mich. 48124

[21] Appl. No.: 585,495

[22] Filed: Mar. 1, 1984

[51] Int. Cl.³ .......................... F16F 9/02; F16J 15/32
[52] U.S. Cl. .................................. 267/119; 267/130; 277/27; 277/110; 277/165; 277/205
[58] Field of Search ............... 188/322.17; 267/64.14, 267/119, 130; 277/27, 110, 165, 205, 3

[56] References Cited

U.S. PATENT DOCUMENTS 3,738,665 6/1973 Bilco .............................. 277/27 X
4,342,448 8/1982 Wallis ................................. 267/119

Primary Examiner—Douglas C. Butler
Assistant Examiner—Richard R. Diefendorf
Attorney, Agent, or Firm—Barnes, Kisselle, Raisch, Choate, Whittemore & Hulbert

[57] ABSTRACT

A fluid die spring comprises a cylinder connected at one end to a reservoir of gas at high pressure. A piston in the cylinder has a smaller diameter rod projecting out the other end of the cylinder for engagement with a movable die member. The rod end of the cylinder has a high pressure seal engaging the rod and arranged to prevent leakage of liquid die lubricant into the cylinder.

10 Claims, 2 Drawing Figures

U.S. Patent   Jul. 16, 1985   4,529,181

FLUID DIE SPRING

This invention relates to fluid cylinders, and, more specifically, to fluid springs between die members of a stamping press.

In metal die forming operations it is common practice to yieldably restrain movement of movable die members by means of fluid springs therebetween in the form of piston-cylinder assemblies connected at one side thereof with a reservoir of gas under pressure, such as nitrogen, and communicating at the other side of the cylinder with the surrounding atmosphere. An arrangement of this type is shown in my prior U.S. Pat. Nos. 4,342,448; 4,154,434; 4,076,103; 4,044,859; 4,005,763 and 3,947,005.

In press operations where die lubricant is not used in excessive amounts it is only necessary to prevent dust and dirt from entering the rod end of the cylinder. This can be accomplished through the use of dust seals, air filters, etc., as shown in some of my aforementioned patents. However, in many press operations the dies are flooded with liquid die lubricant which, over a period of time, can leak into the cylinder and gradually accumulate in the high pressure gas reservoir. The gas reservoir has a fixed volume and, as liquid accumulates therein, its effective volume decreases. Consequently, when the die member contacted by the piston rod causes the piston to retract within the cylinder, the pressure in the reservoir gradually increases to a value substantially greater than contemplated and for which the piston-cylinder assembly was designed. This exceedingly high pressure accelerates failure of the seals between the piston and the cylinder and sometimes results in rupture of the safety overload discs on the reservoir.

Numerous attempts have been made to overcome this problem, such as providing wipers at the rod end of the cylinder for embracing the outer peripheral surface of the piston rod as the piston reciprocates. Such rod wipers are frequently employed in combination with seals at the rod end of the cylinder for preventing the escape of gas from the cylinder into the surrounding atmosphere. These attempts have not been entirely successful because the cause for such liquid leakage into the rod end of the cylinder has not heretofore been fully understood.

In the conventional fluid die cylinder the piston rod has a diameter slightly smaller than the piston and there is, therefore, formed an annular chamber between the piston rod and the cylinder bore on one side of the piston. It has been proposed to form the piston with a hollow central chamber communicating with the annular chamber. Thus, when the piston is retracted, air or gas is displaced from the piston chamber into the annular chamber and, when the piston rod is extended, air is displaced from the annular chamber into the piston chamber. The air/gas pressure in the annular chamber is assumed to be substantially the same at all times as the air/gas pressure in the piston chamber. Furthermore, the air/gas pressure in the annular and piston chambers was assumed to be at least slightly in excess of atmospheric pressure. Accordingly, a seal employed at the rod end of the cylinder has been designed to prevent leakage of the air/gas mixture from the annular chamber outwardly into the surrounding atmosphere. I have found that these assumptions are not true in all cases.

Many conventional presses operate at a speed of between 50 and 100 strokes per minute. When a press operates at this speed the piston is retracted within the cylinder at a very fast rate. In most fluid die cylinders, when the piston is retracted at a high speed and the annular chamber is thus increasing in size rapidly, at least momentarily the pressure in the annular chamber is reduced to a sub-atmospheric value. As a result of this at least momentary partial vacuum in the annular chamber, liquid lubricant leaks past the rod seal into the annular chamber because this rod seal is designed to prevent leakage of gas from this chamber into the surrounding atmosphere. As a consequence, liquid die lubricant gradually accumulates in the cylinder and the fixed-volume, high-pressure, gas reservoir.

Having discovered the real cause of the aforesaid problem, the present invention has for its primary object the prevention of accumulation of liquid die lubricant in the cylinder and high pressure gas reservoir.

A more specific object of this invention is to provide a seal arrangement between the cylinder and the piston rod which effectively prevents the ingress of liquid lubricant into the cylinder.

Figure 2:
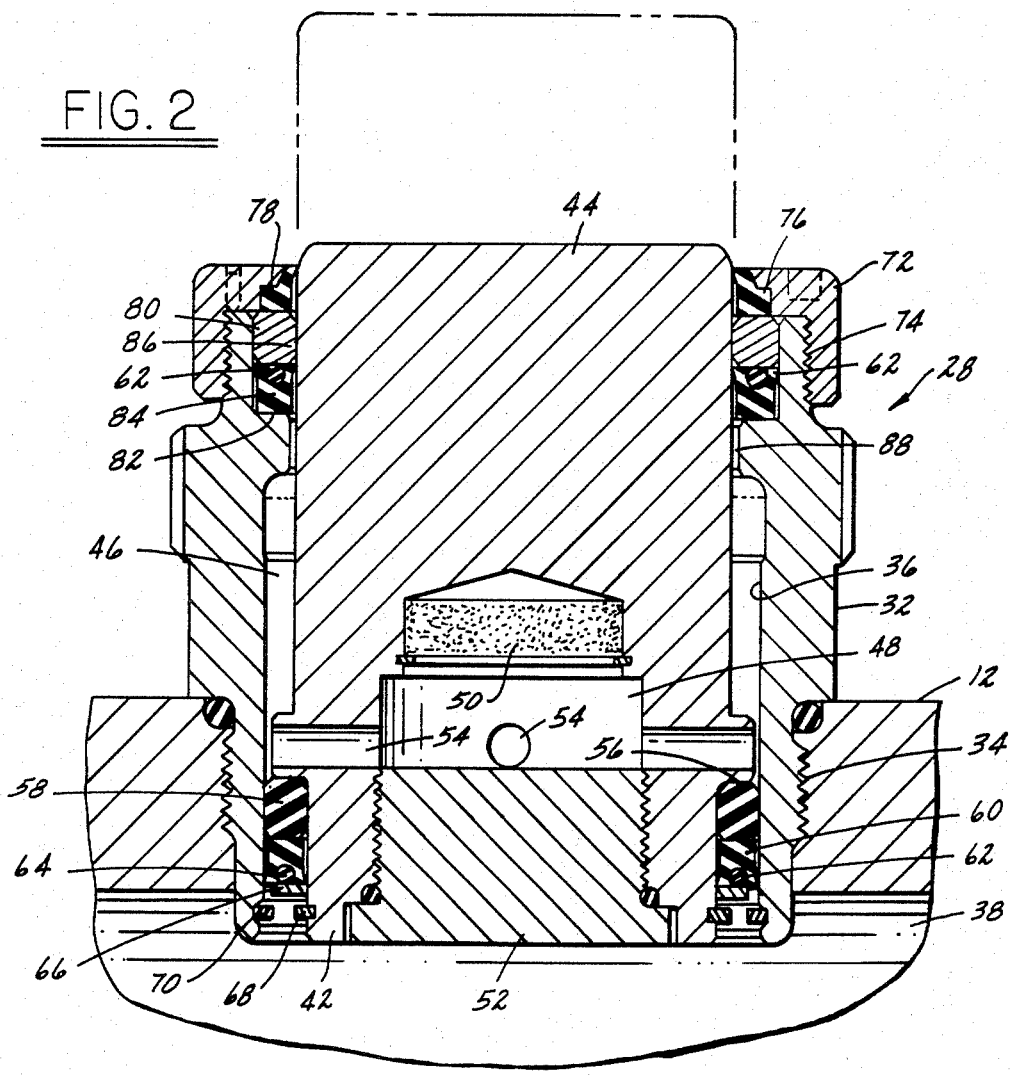

Other objects, features and advantages of the present invention will become apparent from the following description and accompanying drawing, in which:

FIG. 1 is a fragmentary sectional view of a die and die cylinder arrangement according to the present invention; and FIG. 2 is a fragmentary sectional view on an enlarged scale showing the die cylinder.

In FIG. 1 there is illustrated a die assembly 10 adapted to be mounted in a conventional stamping press. The die assembly includes a support plate 12 on which a lower die set 14 is mounted and an upper support plate 16 on which an upper die set 18 is mounted. The lower die set 14 includes a central fixed die member 20 and an outer movable die member 22 mounted around member 20 for vertical sliding movement. Upper die set 18 includes a fixed outer die member 24 and a central movable die member 26 arranged to slide vertically within die member 24. Lower die member 22 is urged upwardly by a pair of fluid piston-cylinder assemblies 28 and upper die member 26 is biased downwardly by the piston rod or piston rod extension 30 of a die cylinder similar to piston-cylinder assemblies 28.

Each piston-cylinder assembly 28 includes a cylinder 32 threaded, as at 34, in support plate 12. The open lower end of the cylinder bore 36 communicates with a reservoir 38 in support plate 12. Reservoir 38 is provided with one or more ports 40 closed by charging plugs or rupture discs. Reservoir 38 has a predetermined fixed volume and is charged with gas, preferably nitrogen, to a predetermined high pressure; for example, 1500 to 2000 p.s.i.

Within bore 36 of cylinder 32 there is arranged a piston 42 having a piston rod 44 projecting out the end of the cylinder opposite reservoir 38. Piston rod 44 has a diameter slightly less than the diameter of cylinder bore 36 so as to define therebetween an annular chamber 46. Piston 42 and rod 44 are formed with a central chamber 48, the upper end of which contains an oil wick 50 and the lower end of which is closed by a plug 52. Piston chamber 48 communicates with annular chamber 46 through four perpendicularly related passageways 54.

Piston 42 is formed with an annular shoulder 56 which is abutted by a fiber piston ring 58. Below piston ring 58 there is arranged around the piston a high-pressure, cup-type, gas seal 60. Seal 60 is formed of a rubber composition and has a pair of downwardly and outwardly projecting lips 62 between which is arranged an annular rubber O-ring 64. The lower face of seal 60 seats on a compression washer 66. A snap ring 68 adjacent the lower end of piston 42 retains ring 58, seal 60 and compression washer 66 in loosely assembled relation on the piston. A snap ring 70 adjacent the lower end of cylinder 32 limits the retraction stroke of the piston within the cylinder.

A cylinder cap 72 is threaded, as at 74, over the upper end of cylinder 32. Cap 72 is formed with an annular recess 76 in which a rod wiper 78 is seated. Rod wiper 78 is constructed and functions in substantially the same manner as the rod wiper shown and described in my above-referred-to U.S. Pat. No. 4,342,448.

The upper end of cylinder 32 is formed with a counterbore 80, the lower end of which is defined by a shoulder 82 on which is seated an annular seal 84, the construction of which is the same as seal 60 at the lower end of cylinder 32. However, seal 84 is disposed with the outwardly flaring lips 62 extending upwardly from the lower body portion of the seal. The radially inner lip 62 of seal 84 engages the outer periphery of piston rod 44 and the radially outer lip 62 of the seal engages the counterbore 80. Between seal 84 and rod wiper 78 there is arranged in counterbore 80 a bronze bushing 86 which has a sliding fit with counterbore 80 and also a sliding fit with the outer periphery of piston rod 44. The inner diameter of shoulder 82 is at least slightly greater than the outer diameter of piston rod 44 so as to provide an annular clearance space 88 therebetween.

When the two die sets 14,18 are in the separated position, piston 42 is urged upwardly to a position wherein piston rod 44 lifts die member 22 to its fully raised position. This is illustrated in FIG. 2 by broken lines. When the descending press ram (not illustrated) approaches the lower end of its stroke, the outer die member 24 displaces the piston rod 44 downwardly at a rate corresponding to the rate of descent of the press ram and support plate 16. Therefore, in a relatively high speed press piston rod 44 is retracted relatively rapidly, at a rate such that the pressure in annular chamber 46 for at least a short period of time is reduced to sub-atmospheric until this pressure equalizes with the pressure in piston chamber 48 through the passageway 54. It will be observed that, when a partial vacuum obtains in annular chamber 46, the pressure on the top side of seal 84 is greater than the pressure on the underside thereof. This pressure differential across seal 84 displaces the lips 62 on seal 84 radially outwardly against counterbore 80 and radially inwardly against the outer periphery of piston rod 44 to thereby prevent leakage of air and liquid lubricant from the surrounding atmosphere into the annular chamber 46.

On the up stroke of the press ram, if the pressure in chambers 46,48 exceeds a predetermined value by reason of either compression or slight leakage across seal 60, the air/gas mixture will leak across seal 84 into the surrounding atmosphere. However, on the down stroke the construction and arrangement of the rod seal 84 prevents any leakage into the cylinder from the surrounding atmosphere.

I claim:

1. In a die assembly of the type which includes a pair of spaced die members mounted on supports guided for relative movement toward and away from each other to form a workpiece between the die members, the combination comprising, a fluid spring extending between one of said die members and its support, said fluid spring comprising a fluid cylinder fixedly mounted at one end on said support, said cylinder having an axial bore therein in which a close-fitting piston is axially slideable, said piston having a piston rod with a free end extending axially through the other end of the cylinder, said piston rod having a diameter less than the diameter of the cylinder bore so that the piston divides the cylinder into a working chamber at one side thereof and an annular chamber surrounding the rod at the opposite side thereof, said working chamber being connected with a fixed-volume reservoir of gas under relatively high pressure for biasing the free end of the piston rod against said one of said die members, said piston having an annular seal thereon for preventing leakage of said high pressure gas from said working chamber into said annular chamber, the other end of the cylinder having a high pressure annular cup-shaped seal with an open end thereon engaging the outer periphery of the rod, the last-mentioned seal being arranged on the cylinder with the open end of the cup facing axially away from the annular chamber so that, in the event the pressure in the annular chamber becomes sub-atmospheric, the open end of the cup is radially expanded by the differential pressure across the seal into firm sealing engagement with the cylinder and piston to prevent air and liquid contaminants from the atmosphere surrounding the cylinder from leaking past the last-mentioned seal into said annular chamber.

2. The combination called for in claim 1 wherein said piston has a chamber therein and including passageway means establishing communication between said piston chamber and said annular chamber so that, when the piston is shifted toward the other end of the cylinder, said annular chamber is reduced in size and gas therein is displaced into the piston chamber and, when the piston is shifted in the opposite direction, said annular chamber is enlarged in size and gas is displaced from the piston chamber into the annular chamber.

3. The combination called for in claim 2 wherein said passageway means are sized such that in response to rapid retraction of the piston said annular chamber is subjected to sub-atmospheric pressure.

4. The combination called for in claim 2 wherein said annular chamber is in communication with the atmosphere surrounding the cylinder only as a consequence of leakage past said last-mentioned seal.

5. The combination called for in claim 2 wherein said piston chamber is sealed against ingress of air and other contaminants, except through said means establishing communication with said annular chamber.

6. The combination called for in claim 2 wherein said piston chamber is closed except for said means establishing communication with said annular chamber.

7. The combination called for in claim 1 including an annular rod wiper on said cylinder disposed axially outwardly of said last-mentioned seal.

8. The combination called for in claim 7 wherein the rod end of the cylinder is formed with a counterbore, said wiper and last-mentioned seal being disposed within said counterbore.

9. The combination called for in claim 8 wherein said last-mentioned seal comprises an annular body portion having an inner diameter greater than the diameter of the piston rod and an outer diameter less than the diameter of the counterbore, said body portion having a pair of resiliently-flexible, radially inner and outer lips extending axially from the inner and outer peripheries thereof in the direction opposite said annular chamber, said radially inner lip flaring radially inwardly and engaging the outer periphery of the piston rod and said radially outer lip flaring radially outwardly and engaging said counterbore.

10. The combination called for in claim 9 including an O-ring in said last-mentioned seal disposed between said lips and adapted to radially expand said lips when axially compressed.

* * * * *